(No Model.)
G. E. GUERNE.
HARROW FOR RACE COURSES.
No. 586,737. Patented July 20, 1897.
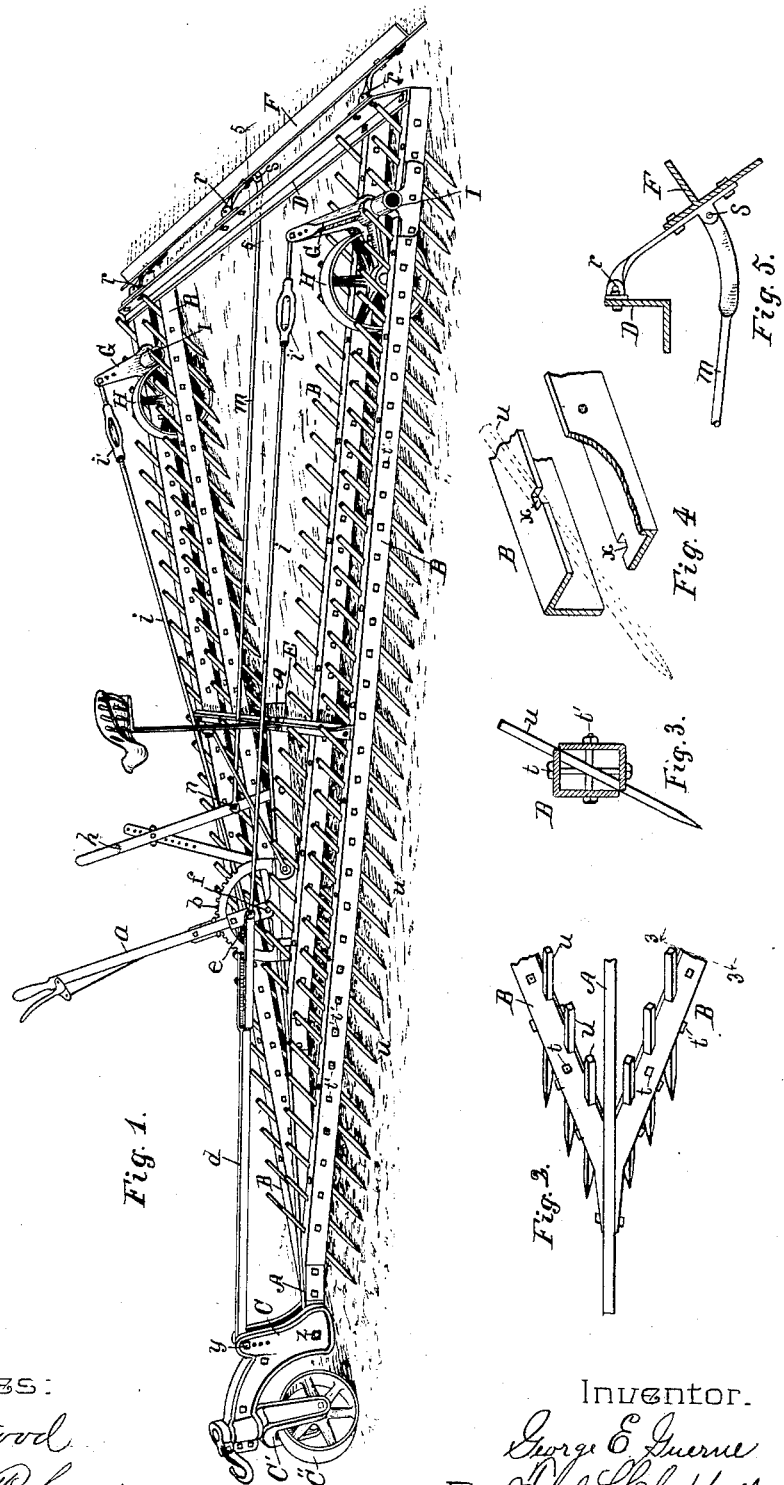
Witnesses:
Walter S. Wood
Walter H. Palmer
Inventor.
George E. Guerne
By Fred L. Chappell
Att'y.
THE NORRIS PETERS CO., PHOTO-LITHO., WASHINGTON, D. C.

UNITED STATES PATENT OFFICE.

GEORGE E. GUERNE, OF SANTA ROSA, CALIFORNIA.

HARROW FOR RACE-COURSES.

SPECIFICATION forming part of Letters Patent No. 586,737, dated July 20, 1897.

Application filed January 16, 1894. Serial No. 497,059. (No model.)

*To all whom it may concern:*

Be it known that I, GEORGE E. GUERNE, a citizen of the United States, residing at the city of Santa Rosa, in the county of Sonoma and State of California, have invented certain new and useful Improvements in Harrows for Race-Courses, of which the following is a specification.

My invention relates to harrows, and more particularly to harrows used for leveling purposes on race-courses and for similar purposes, my improved harrow being especially adapted to leave the track elastic over its entire surface, so that it acts as a cushion on the feet of the horses.

The objects of my invention are, first, to provide a harrow which shall thoroughly pulverize the uneven portions of the ground which may project above the desired level; second, to provide a harrow in combination with a leveling-scraper which shall smooth and pack the uneven portions pulverized by the harrow and fill them into any depressions which occur below the desired level; third, to provide a harrow that shall prepare the track so that it shall be like a cushion to a horse's feet; fourth, to provide in a harrow carried upon three wheels suitable means of adjusting the wheels independently or together; fifth, to provide a harrow adjustable for grading purposes, so that the general level may be gradually changed by its use; sixth, to provide in a harrow of this class improved means of attaching a team so that the direction of its course may be easily changed without the use of a tongue; seventh, to provide in a harrow improved means of securing the harrow-teeth so that they can all be easily adjusted independently and yet be securely held in place when in use; eighth, to provide in a harrow an improved arrangement of the teeth, so as to lessen the strain on them and make them effective for the purpose intended; ninth, to provide in a harrow containing three wheels, as described, a suitable lever and connections for adjusting the wheels; tenth, to provide in a harrow supported on three wheels an improved connection between the draft and the operating-lever, so that the draft of the team shall assist the operator; eleventh, to provide an improved means of preventing a raising of the nose of the harrow out of the ground; twelfth, to provide an improved means of connecting, so that in use the draft of the team shall draw or pull from over the entire surface of the harrow and carry it level and even over the track; thirteenth, to provide in a harrow improved means of attaching the draft so that the center of force is at the center of resistance well back from the front. I accomplish these objects by the mechanism shown in the accompanying drawings, in which—

Figure 1 is a side perspective view of the entire machine. Fig. 2 is a detail top plan view of the nose end of the harrow-frame, showing the arrangement of the teeth. Fig. 3 is a cross-section of one of the side rails B, on line 3 3 of Fig. 2, showing the arrangement of the bolts $t$ and $t'$ and one of the teeth $u$. Fig. 4 is a further detail of a side rail B, the two halves being separated to show the method of clamping the teeth $u$. Fig. 5 is a sectional view, on line 5 5 of Fig. 1, showing the method of adjusting the scraper F.

Similar letters of reference refer to similar parts throughout the several views.

The general form of my improved leveling-harrow is that of an isosceles triangle. The scraper F is attached at the base, which is at the rear, and a row of the teeth is attached through the side rails of the frame and project downward and forward. Another row of the teeth is attached through a rail which is parallel to the side rail in much the same manner and position, one of these rails being placed on each side, thus making a double row of teeth toward each side of the harrow. Both of the outside and both of the inner side rails B are securely bolted at the front to the longitudinal central beam A and are held at the rear by being securely bolted to the angle-iron D, thus forming a very strong frame.

The side rails B, which hold the teeth, are formed of two strips of angle-iron, the inner parts of which are placed facing each other. Notches $x$ are cut in the horizontal limb of each piece to receive the spike-teeth $u$. Bolts $t$ and $t'$ are passed through the angle-iron at right angles to each other and draw the two halves firmly against the teeth $u$, so that they are securely clamped from both directions, as seen in Fig. 3. By loosening the bolts $t$ and $t'$ slightly near a tooth it can be adjusted as desired, and a tightening of the bolts secures it. The teeth are arranged so that their central lines lie in planes parallel to a vertical plane through the central line of the harrow when it stands on a level and parallel to each other. The teeth project downward and forward at an angle of about forty-five degrees, so that most of the cutting is done at the points, which project well forward. The points of the teeth, being very sharp and very pointed, cut the ground only to the depth to which they project and merely loosen it below that level, so that it shall form a perfect cushion for the foot of a horse.

To the rear part of each side of the harrow and between the parallel side rails B are secured the wheels H H, carried on bearings at the ends of suitable bent levers G. The levers G are journaled into suitable boxes I, which are bolted to the side rails B. The axes of the wheels and of the journals of the levers are parallel with the rear of the harrow. To the front end of the harrow is pivoted a casting C at $z$, the pivot passing through the casting and through the front end of the central beam A. The casting C projects up and forward into an arm. In the front of this arm is a vertical bearing for the caster $C'$, to the upper end of which the hook for attaching the whiffletrees is rigidly attached and projects forward in the line of the direction of wheel $C''$. Thus when a team is attached and is drawing the harrow and change their direction they change the course of the wheel $C''$ to accommodate the change of direction of the pull, which carries the harrow steadily and evenly in that direction. The point of draft being also high up the pull of the team has no tendency to raise the nose of the harrow from the ground, but carries it along evenly and on a level.

To the central beam A, back of the side rail B, is attached the adjusting-lever $a$, which is pivoted at $f$ and is adjustable by the notched segment $b$ and the usual hand-grip and catch. The forked connecting-bar $d$ is pivoted to each side of the lever $a$ at $e$ a little above the point of the attachment of the lever and connects the lever $a$ to the casting C, being pivoted at $y$. A series of holes in the casting C makes the pivoting at $y$ adjustable. Running from the point $e$ on lever $a$ back to the levers G are the connecting-rods $i$, which are pivotally connected to the upper ends of the levers G and to the lever $a$. A series of holes in the upper ends of levers G makes the connections adjustable. In the connecting-rods $i$ are turnbuckles $i'$ for adjusting the length of the connecting-rods independently. Thus it will be seen that a change in the position of the lever $a$ will cause the same change in the height of the wheels H H and $C''$, which will raise or lower the harrow evenly, depending on which direction the lever $a$ shall be moved.

It will be noted that the point of draft is high up at the front of the harrow and that the front casting C, which carries the draft-hook, is pivoted to the nose of the harrow and is connected by bar $d$ to the central adjusting-lever. This particular combination causes any pull on the draft-hook to have a tendency to raise the entire harrow when the operating-lever is released and consequently makes the lever easy of operation. When the operating-lever is set, the main force of the draft comes at this point and through the connecting-rods $i$ to the rear of the machine and thus brings the center of the draft near the center of the load and not at the front end (as is usual with harrows) and consequently carries all evenly.

It will be seen also that changing the length of the connecting-rods $i$ by means of the turnbuckles $i'$ that the harrow can be tipped to one side or the other and thus grade a race-course on a slight incline rather than on a true level; or, in other words, the harrow can be made to change a true level to a slight incline or to change a slight incline to a true level. Turnbuckles $i'$ are only needed in the connecting-rods $i$ to accomplish any variation required between the wheels H H and $C''$, as the proper changes in the relative length of these two rods $i$ will effect all the changes possible if another turnbuckle were placed in connecting-bar $d$.

To the rear of this harrow is attached a scraper F, which is made up of T-steel or angle-iron, as preferred. This scraper is pivoted to the rear of the harrow by suitable arms or lugs at $r$. To the under side of the scraper is pivoted the connecting-rod $m$ at $s$, the said connecting-rod passing forward and connecting to the adjustable lever $h$ by the pivot $n$. It will thus be clear that the scraper F is adjustable by means of the lever $h$.

Across the central portion of the harrow an angle-iron E is bolted, which serves as a brace to hold all of the parts securely in place. To this angle-iron E is bolted a standard bearing a convenient seat for the driver and operator of the machine.

I desire to say that in the construction of my improved leveling-harrow the details can be greatly varied without departing from my invention.

Having thus described my invention, what I claim as new, and desire to secure by Letters Patent, is—

1. In a harrow for grading and cushioning purposes on race-courses, the combination of the side rails B, and the cross-piece D, united in the form of an isosceles triangle and bearing downwardly and forwardly projecting teeth, $u$, an adjustable wheel C, at the front of said harrow, independently-adjustable wheels H near each rear corner, the adjusting-lever $a$, connected by bar $d$, to the front wheel C, by the connecting-rods $i$, containing turnbuckles $i'$, to each of the rear wheels H, and the scraper F, pivoted to the rear of said harrow and connected by connecting-rods $m$, to the adjusting-lever $h$, all substantially as described for the purpose specified.

2. In a harrow a frame of beams joined in triangular form; the beams being composed of oppositely-facing angle-irons; in combination with spike-teeth extending downwardly and forwardly between the edges of the said angle-irons to stand in vertical planes parallel to the direction of the draft of the machine; bolts $t$, $t'$, extending through said angle-irons at right angles to each other and at right angles to the limbs of the angle-irons to clasp the teeth between the angle-irons as specified.

In witness whereof I have hereunto set my hand and seal in the presence of two witnesses.

GEO. E. GUERNE. [L. S.]

Witnesses:
A. D. HARRIS,
W. S. WOOD.